US010144171B2

(12) United States Patent
Kremers

(10) Patent No.: US 10,144,171 B2
(45) Date of Patent: Dec. 4, 2018

(54) METHOD FOR MANUFACTURING CONTINUOUS COMPOSITE TUBE, APPARATUS FOR MANUFACTURING CONTINUOUS COMPOSITE TUBE

(75) Inventor: Marcus Antonius Ivonne Kremers, Amsterdam (NL)

(73) Assignee: AO & G Hollding B.V., Ijmuiden (NL)

( * ) Notice: Subject to any disclaimer, the term of this patent is extended or adjusted under 35 U.S.C. 154(b) by 0 days.

(21) Appl. No.: 14/002,944

(22) PCT Filed: Mar. 5, 2012

(86) PCT No.: PCT/NL2012/050134
§ 371 (c)(1),
(2), (4) Date: Oct. 8, 2013

(87) PCT Pub. No.: WO2012/118379
PCT Pub. Date: Sep. 7, 2012

(65) Prior Publication Data
US 2014/0020766 A1    Jan. 23, 2014

(30) Foreign Application Priority Data
Mar. 3, 2011   (NL) .................................. 2006335

(51) Int. Cl.
*B29C 53/56*   (2006.01)
*B29C 63/00*   (2006.01)
(Continued)

(52) U.S. Cl.
CPC ........ *B29C 53/566* (2013.01); *B29C 63/0069* (2013.01); *B29C 63/105* (2013.01);
(Continued)

(58) Field of Classification Search
USPC .................................................. 156/185, 195
See application file for complete search history.

(56) References Cited

U.S. PATENT DOCUMENTS 2,467,999 A  *  4/1949  Stephens ....................... 138/144
2,630,157 A       3/1953  Smellie
(Continued)

FOREIGN PATENT DOCUMENTS

CH           350433        11/1960
EP          0154321         9/1985
(Continued)

OTHER PUBLICATIONS

International Search Report from PCT/NL2011/050413 dated Sep. 2, 2011.
(Continued)

*Primary Examiner* — Jeffry H Aftergut
(74) *Attorney, Agent, or Firm* — Adsero IP

(57) ABSTRACT

Method for manufacturing a continuous composite tube comprising translating a tube liner through a manufacturing station wherein the manufacturing station comprises a winding station and a consolidation station located at a distance downstream of the winding station; winding a composite tape on the tube liner at the winding station for forming a tape layer; consolidating the composite tape on the tube liner at a consolidation zone of the consolidation station by pressing and heating to the tape.

18 Claims, 7 Drawing Sheets

(51) Int. Cl.
*B29C 63/10* (2006.01)
*B29C 70/08* (2006.01)
*B29C 70/32* (2006.01)
*B29C 70/38* (2006.01)
*B29C 70/50* (2006.01)
*B29D 23/00* (2006.01)
*F16L 9/16* (2006.01)
*F16L 9/12* (2006.01)
*F16L 11/16* (2006.01)
*B29C 53/68* (2006.01)
*B29L 23/00* (2006.01)

(52) U.S. Cl.
CPC .......... *B29C 70/086* (2013.01); *B29C 70/32* (2013.01); *B29C 70/386* (2013.01); *B29C 70/50* (2013.01); *B29D 23/001* (2013.01); *F16L 9/12* (2013.01); *F16L 9/16* (2013.01); *F16L 11/16* (2013.01); *B29C 53/68* (2013.01); *B29C 63/0021* (2013.01); *B29L 2023/22* (2013.01); *Y10T 137/0318* (2015.04)

(56) References Cited

U.S. PATENT DOCUMENTS

| | | | |
|---|---|---|---|
| 2,731,067 A | | 1/1956 | Miller |
| 3,148,102 A | * | 9/1964 | Eakins et al. .......... 156/161 |
| 3,457,962 A | | 7/1969 | Shobert |
| 3,494,812 A | | 2/1970 | Cvacho |
| 3,530,901 A | | 9/1970 | Richardson |
| 3,531,357 A | | 9/1970 | Heckly |
| 3,567,542 A | | 3/1971 | Jackson |
| 3,769,127 A | * | 10/1973 | Goldsworthy ........ B29C 47/023 156/172 |
| 4,020,202 A | | 4/1977 | Kreft |
| 4,058,427 A | | 11/1977 | Wilson |
| 4,151,031 A | * | 4/1979 | Goad .................. B29C 53/043 156/201 |
| 4,385,952 A | | 5/1983 | Futakuchi |
| 4,734,146 A | | 3/1988 | Halcomb |
| 4,790,898 A | | 12/1988 | Woods |
| 4,867,824 A | | 9/1989 | Gill |
| 4,877,193 A | | 10/1989 | Vaniglia |
| 4,891,179 A | * | 1/1990 | Peacock et al. ............ 264/565 |
| 4,943,334 A | | 7/1990 | Medney |
| 5,261,991 A | | 11/1993 | Zackrisson |
| 5,435,868 A | | 7/1995 | Yu |
| 5,587,041 A | | 12/1996 | Sandusky |
| 6,047,756 A | | 4/2000 | Uchida |
| 6,782,932 B1 | | 8/2004 | Reynolds |
| 7,238,250 B2 | | 7/2007 | Kindervater |
| 2001/0039700 A1 | | 11/2001 | Krueger |
| 2002/0119271 A1 | | 8/2002 | Quigley |
| 2003/0209312 A1 | * | 11/2003 | Hauber .................. 156/172 |
| 2005/0258575 A1 | * | 11/2005 | Kruse et al. ............ 264/512 |
| 2007/0175573 A1 | | 8/2007 | Fox |
| 2009/0250134 A1 | * | 10/2009 | Slagsvold et al. .......... 138/137 |
| 2010/0062249 A1 | | 3/2010 | Harazono et al. |

FOREIGN PATENT DOCUMENTS

| | | | |
|---|---|---|---|
| EP | 0198744 | | 10/1986 |
| EP | 0265915 A2 | * | 5/1988 |
| EP | 0355308 | | 2/1990 |
| EP | 0423954 | | 4/1991 |
| EP | 0463611 | | 1/1992 |
| EP | 0535264 | | 4/1993 |
| EP | 1118450 | | 7/2001 |
| FR | 2389060 | | 11/1987 |
| GB | 1291729 | | 10/1972 |
| GB | 1 485 586 | | 1/1975 |
| JP | U56066423 | | 4/1981 |
| JP | A57069023 | | 4/1982 |
| JP | A61002540 | | 1/1986 |
| JP | 6316718 A | | 7/1988 |
| JP | A05031810 | | 2/1993 |
| JP | A11111893 | | 4/1999 |
| WO | 98/03326 | | 1/1998 |
| WO | WO-98/38030 A1 | * | 9/1998 |
| WO | WO 2004/007179 | | 1/2004 |
| WO | WO 2005/108046 | | 11/2005 |
| WO | 2006/107196 | | 10/2006 |
| WO | WO-2006/107196 A1 | * | 10/2006 |

OTHER PUBLICATIONS

International Application No. PCT/NL2012/050134; International Preliminary Report on Patentability; dated May 13, 2013; 5 pages.
International Application No. PCT/NL2012/050133; International Preliminary Report on Patentability; dated Sep. 12, 2013; 8 pages.
Office Action from JP Application 2013-514132 dated Mar. 16, 2015.
Office Action from U.S. Appl. No. 14/002,937 dated Nov. 4, 2015.
International Search Report from PCT/NL2006/000177 dated Aug. 22, 2006.
Office Action from U.S. Appl. No. 14/002,937 dated Sep. 29, 2016.
Office Action from U.S. Appl. No. 13/702,552 dated Nov. 2, 2016.
Office Action from U.S. Appl. No. 13/702,552 dated Apr. 27, 2017.
Office Action from U.S. Appl. No. 14/002,937 dated May 23, 2018.
Office Action from U.S. Appl. No. 14/002,937 dated Oct. 10, 2017.

* cited by examiner

METHOD FOR MANUFACTURING CONTINUOUS COMPOSITE TUBE, APPARATUS FOR MANUFACTURING CONTINUOUS COMPOSITE TUBE

The invention relates to a method for manufacturing a continuous composite tube, more specific a thermoplastic composite tube.

Tubes with a long length are known and are often used in subsea or subsurface applications or as overland flowlines, though the application is not limited thereto. A continuous tube is for example preferably used in exploration, production, intervention and drilling applications, onshore and offshore, whereby the largest benefits may be found offshore. Such applications may often require lengths of several hundreds of meters up to several kilometers pipe.

Steel pipes are commonly used, which however have disadvantages such as corrosion, fatigue, yielding, weld sensitivity, weight, etc. Also, transport of a relatively long length steel pipe by means of coiled tubing can be difficult. Further, for manufacturing of long length steel pipes, different sections of steel pipe are usually welded together, which may be a time consuming manufacturing process wherein the weld line may result in a weak spot of the pipe.

Therefore, an attempt has been made to produce composite tubes of a relatively long length. Different technologies are known, such as braiding or filament winding etc. to produce a composite pipe, either in sections or in a more or less continuous process.

It is known that there are several methods to manufacture composite pipe in a long length (continuous pipe). For example, a production line of winding machines is used that wind dry fibres or a pre-impregnated prepreg tape of fibre and resin onto the liner or previous layer, to build up a laminate of various layers of tape or fibre. The structure of the composite pipe can either be unbonded, in which the structural elements are loose and not structurally connected to each other, or so-called bonded, in which the elements are structurally connected and form a solid structure. Furthermore, the structure of the composite pipe can be based on a thermoset or thermoplastic polymer.

Significant pre-tension on the tape and/or the fibres in the tape might be used to provide consolidation pressure during curing for thermoset composite or consolidation for thermoplastic composite. After creating the laminate, the laminate is cured or consolidated by applying heating. For unbonded pipe the curing or consolidation by heating may be omitted, and the loose layers can be used as-is or covered by an extruded layer of polymer.

Drawbacks of the known composite pipes are for example limited external pressure resistance for unbonded pipe, microcracking for thermoset pipe, limited impact resistance for thermoset pipe, limited chemical resistance, limited resistance to rapid gas decompression, limited spoolability for bonded thermoset pipes, limited internal pressure strength, etc.

Moreover, these conventional processes may require the product to be manufactured in a single production step. Also, conventional manufacturing processes impose a limit on the time period to manufacture the pipe in case of a thermoset laminate and/or a limit on the production speed. Further, the conventional processes usually require a complex production machinery.

In addition, a relatively high tension may be required which may result in tape and/or fibre rupture while applying pretension on the tape and/or the fibres and may result in relatively high residual stresses in the pipe. The use of pre-tension during the manufacturing process implies using a relatively high winding angle for the fibres and/or the tape. The pretension during the process can induce torsion load onto the liner or substrate which can deform the pipe and can have a negative effect on the quality and/or the mechanical strength of the pipe.

Further, it is known that for the manufacturing of consolidated thermoset or thermoplastic pipes or laminates, tape placement or fibre placement processes can be used in which no or limited pre-tension is used. In the area where the tape is applied to the product, called the nip-point area, a pressure body such as a roller or a shoe is used to apply pressure to the laminate in order to consolidate the tape to the substrate at the nip-point area. An example for the manufacturing of continuous thermoplastic composite pipe is described in WO 2006/107196. Publication WO 2006/107196 describes an apparatus for manufacturing a fiber-reinforced tube. The tape is wounded around the tube liner while the tape is pressed onto the tube liner at the nip-point by a pressure roller providing for a line contact. So, the tape is simultaneously wound and pressed onto the tube liner. Optionally, heating of the tape at the nip point may be applied. A tape layer can be wound and pressed onto a previously wound tape. However, drawbacks of this method are for example the limited processing speed and/or the complex machinery.

Due to these drawbacks, the conventional composite pipes are not widely used in especially offshore, subsea, downhole, drilling and high-pressure applications.

An object of the invention is to provide a method for producing a composite tube in a relatively long length that obviates at least one of the above mentioned drawbacks while maintaining the advantages.

Thereto, the invention provides a method for manufacturing a continuous composite tube according to claim 1.

The current invention relates to a process primarily to make bonded pipe. A bonded or consolidated laminate has better mechanical performance, has the capability to withstand compression loads such as external pressure, handle combined and off-axis load cases and is better resistant to rapid gas decompression.

The present invention is primarily used to manufacture thermoplastic composite pipe, although the use of thermoset composite material is also possible. Another possibility is to use dry fibre tows, to manufacture a dry fibre preform that is infused with a polymer resin in a subsequent manufacturing step. The advantage of using thermoplastic composite for a long continuous pipe with a consolidated, bonded laminate is the higher ductility and allowable strain of the material, providing impact resistance, spoolability, residual strength and toughness.

With the method according to the invention, a consolidated thermoplastic composite pipe can be manufactured. Such a bonded pipe has better resistance to external pressure, better internal pressure strength, ability to withstand loads that are off-axis to the fibre direction, better spoolability than thermoset composite pipe. If the liner, composite and possibly coating material are made from the same thermoplastic polymer, all layers can be weld-fused together providing a pipe system that has better resistance to rapid gas decompression than conventional composite pipes that are either unbonded or combine different materials in the pipe resulting in lower interface strength between the different materials.

For example, a pipe can be manufactured using a single material concept, meaning that the matrix material of the tape can be the same or similar to the material of the tube liner, and the same of the outer coating, resulting in better fusing and consolidating, thus better performance.

By first winding the tape onto the tube liner and then, downstream of the winding station, consolidating the tape onto the tube liner, the tube can be manufactured in a predictable and controlled manner. Since winding and consolidating of the tape are spatially separated along the longitudinal axis of the tube liner, both processes can be performed independently of one another and therefore can be better controlled. In fact, the consolidation of the tape is decoupled from the winding of the tape.

Further, by using a tube liner, a mandrel for manufacturing the composite tube may be omitted. The tape is wound directly onto the tube liner and is thereafter consolidated to the tube liner to form an integrated layer with the tube liner. Further tape layers may be wound and consolidated on the previous tape layer on the tube. Because no mandrel is needed, there is no limit to using multiple winding and consolidation stations. In conventional pulltrusion processes, or in the conventional Drostholm continuous filament winding process, a mandrel is used that is supported on one side, within the manufacturing station. In such processes, only one manufacturing station can be used. Also, the process according to the invention can be repeated by repeating the production process, for example by translating the pipe another time through the manufacturing station. Therefore, the process poses no limit to the thickness of the composite laminate and the process can be scalable, depending on the required thickness.

A continuous composite tube may be obtained, so joints to connect discrete sections of tube can be omitted and/or minimalized, and the installation and/or operation may be implemented faster.

The tube liner may be understood to be a plastic tube liner and/or a composite tube comprising already at least one consolidated tape layer. A composite tape is understood to comprise a fibre-reinforced plastic tape.

By consolidating the tape layer onto the tube liner by pressing the tape layer over a consolidation area onto the tube liner, a significant length of the tape layer in axial direction of the tube liner can be consolidated at once. In addition, the consolidation area extends over at least a part of the circumference of the tube liner such that a significant area, both axial and circumferential can be consolidated at once. Thus, the processing speed of the tube liner may be increased with respect to prior art methods which consolidate for example at the nip-point The consolidation area comprises a substantial circumferential section of the tube, which may be referred to as axial-circumferential consolidation. In a preferred embodiment, the consolidation zone extends over approximately the complete circumference of the tube, so over a predetermined axial length of the tube, the tape layer can be consolidated over the whole circumference of the tube, which may increase the processing speed more. It also ensures that all parts of the laminate are consolidated, and that no areas of unconsolidated material can occur. For example, instead of two or three subsequent consolidation areas each extending over half or a third of the circumference of the tube liner respectively, a single consolidation area may be provided that extends over the complete circumference of the tube liner, resulting in an improved quality.

In particular when using a thermoplastic unreinforced tube liner, applying the pressure over an area avoids using a high local pressure could possibly result in damage or collapse of the liner. This collapse risk may be increased with the heat that can be applied at the consolidation zone, which will lower the strength and stiffness of the unreinforced liner. To apply the pressure over a larger area is contrary to the prior art methods, such as fibre placement, in which a roller or shoe is used at the nip-point, where the tape makes contact with the liner tube. In such processes only a very local, line-type contact is used. This results in a small area on which pressure can be applied. To provide high enough consolidation force, high pressures are used in prior art methods.

By applying pressure over a consolidation area with a significant axial length according to the invention, a thorough consolidation may be provided and/or an increased processing speed may be obtained, contrary to the prior art where consolidation is done over a line or short consolidation area, usually at or near the nip-point line, e.g. with a roller of shoe pressing on the tape and/or laminate.

The manufacturing performance may increase since consolidation of the tape onto the tube liner can be done over a consolidation area over an axial length of the tube, which can be much longer than in the conventional method. The axial length can e.g. be approximately 5 cm up to approximately several meters. It may be clear that the axial length depends on various parameters, such as tube diameter and/or tape material and/or tape thickness and/or tape material processing time. The diameter of a tube may typically be e.g. 1 inch or 25 inches or any diameter therebetween. According to the invention external pressure is applied to the tape layer in the consolidation area, therefore the tape can be laid onto the tube liner with very few or approximately no pretension in the tape and/or in the fibres of the tape.

External pressure is applied by a pressure body which is external to the tape and/or to the tube liner. By providing the pressure by a pressure body, the pressure does not need to be provided by the tape, therefore, the tape can have limited or no pre-tensioning. Also, by winding the tape with limited pretension, various winding angles may be possible and the tape may even be laid onto the tube liner with an angle of approximately 0° with respect to the axial axis of the tube liner. So, improved mechanical performance of the composite tube may be obtained. In some prior art methods, pressure is usually provided by pretensioning the tape during winding of the tape onto the tube. Afterwards, heat is applied for consolidation. Since pretensioning of the fibres in the tape may result in residual stresses in the pipe after consolidation, the mechanical performances may be less than a pipe manufactured according to the invention.

In fact, according to the invention, the orientation of the consolidation area is decoupled from the tape orientation, whereas according to the prior art the consolidation area at or near the nip-point line has the same orientation as the tape, approximately perpendicular to the direction of the tape. This way, according to the invention, the length of the consolidation area can be increased, which may reduce the required pressure for a given production speed and makes it possible to consolidate without a mandrel, on a relatively flexible tube liner.

A further advantage is that the pressure body is only dependent on the pipe diameter, and not on the winding angle, as is the case in the conventional method in which a pressure body is used perpendicular to the tape direction. The consolidation station may be relatively easily scaled for different pipe diameters, a large pipe diameter only requires a larger size e.g. diameter of at least the pressure body.

Preferably, pressurizing the tape onto the tube liner is force controlled, so preferably, the pressure body is force controlled, contrary to a geometry controlled pressure body. A force controlled pressure body can accommodate irregularities on the tube liner and/or an irregular tube liner, e.g. an oval tube liner due to spooling. Also, by a force controlled pressure body, the pressure applied onto the tape layer may be more or less approximately even distributed over the consolidation area on which the pressure is applied.

A geometry controlled pressure body would for example be a solid die with a fixed geometry for the opening, which, if an irregular tube liner is used, results in different pressures along the circumference of the pipe, resulting in a pipe of less quality. A force controlled pressure body can be a flexible pressure body, which may comprise a vacuum between the pipe and the pressure body to generate the contact pressure, of course many variants of a force controlled pressure body are possible.

By using a pressure body, in particular a flexible force controlled pressure body, for pressing the tape onto the tube liner, the tape can be pressed onto the tube liner over a relatively large surface area in axial and circumferential direction of the tube liner. Such a flexible pressure body is force controlled and can easily be scaled to different tube diameters. In fact, a force controlled pressure body is a flexible pressure body. For example, the pressure body may comprise multiple fingers that may be provided subsequently and/or over a part of the circumference of which each finger can be spring actuated to provide for the force control, such a pressure body can be considered a flexible force controlled pressure body. The finger itself may have a fixed geometry for contacting the tape layer, or may have a flexible geometry, e.g. because of a rubber tip, for contacting the tape layer. Many variants are possible. Various embodiments are possible.

Preferably, the flexible pressure body is flexible in axial direction, but also in circumferential direction, allowing optimal accommodation and/or correction of irregularities.

Advantageously, the pressure is provided by a pressure body that is in sliding contact with the tape layer during translation of the tube liner. With such a pressure body, the pressure body can approximately continuously press the tape onto the tube liner while translating the tube liner through the manufacturing station. Also, due to the sliding contact, irregularities in the tape layer may be approximately flattened to a certain extent.

During consolidation the tape layer is also heated for bonding and/or fusing of the tape layer to the tube liner or a previously wound tape layer. The tape may be heated and/or the tape layer may be heated. The heat may be applied in advance of applying the pressure, or the heat may be applied simultaneously and at the same location of the applied pressure. In addition to heating, pre-heating may be applied to at least partially melt the tape layer and/or the tube liner.

Heating can be done indirectly, e.g. via infrared, gas, hot air, induction, laser, micro-wave, or directly, via contact heating. Preferably, the tape is heated by contact heating to minimize losses and to maximize heat exchange between the heating device and the tape.

Advantageously, the pressure body is heated and provides the contact heating for heat transfer to the pipe during contact with the pipe while pressurizing. During pressing of the pressure body, the heat can be transferred to the tape to melt the tape and/or components of the tape for consolidating the tape onto the tube liner.

Optionally, at the consolidation zone also cooling may be applied to the tape and/or laminate to freeze the laminate. The consolidation zone may then for example comprise of first heating and/or pre-heating, then at least pressing and then cooling. First, heat and/or pre-heat may be applied to at least partly melt the tape in a heating and/or pre-heating zone, then at least pressure may be applied to fuse the tape to the previous layer in a pressure zone. Thereafter, there may be cooled to freeze the fused tape in a cooling zone. By providing additionally cooling, the production speed may be increased. Alternatively, following a consolidation zone, a cooling zone providing cooling only, may be arranged. In a consolidation zone at least a pressure zone is provided, while advantageously simultaneous heating is provided. Similar to heating, cooling may be provided by contact cooling.

Also, optionally, multiple consolidation zones may be applied. Each consolidation zone comprises at least pressing and heating, optionally pre-heating and more optionally cooling. Consolidation zones may be mutually different in at least the provided pressure and/or temperature, either for heating or for cooling. For example, the temperature and/or pressure may be increased from one consolidation zone to another consolidation zone.

By providing internal pressure in the tube liner during consolidating, the external pressure applied by the pressure body may be applied more effectively. Furthermore, the internal pressure can decrease the ovalisation of the tube liner that may occur due to spooling of the pipe.

Adhesion of the tape onto the tube liner and/or a previous tape layer is usually obtained without the application of an adhesive interface layer, but this may also be done. An adhesive interface layer needs to consolidated or cured also by applying heat and pressure, which can be done by the method according to the invention for increasing processing speed and/or quality.

At the nip-point area, the use of a local roller or shoe can be used to aid the first consolidation of the tape to the tube liner, in combination with the afore-mentioned consolidation zone for pressing and heating downstream of the winding station. The nip-point area is situated at the winding station.

The pressure body or bodies in the consolidation zone can be either rotating around the tube liner, in approximately circumferential direction or under an angle, translating in axial direction of the pipe, for example in a caterpillar type machine, or stationary (neither translating or rotating). Furthermore, the pressure body or bodies themselves can be rollers or non-rolling elements. The non-rolling elements have sliding contact with the tape material and/or tube liner.

As an embodiment, the pressure body can be stationary with respect to the tape and/or the tube liner, for example, with non-rolling elements, so that the pressure body can be approximately continuously in contact with the tape during translation of the tube liner through the manufacturing station. A more or less continuous production process may be possible and relatively long lengths of composite tube can be manufactured as a continuous composite tube. With such a pressure body or bodies, the pressure body can approximately continuously press the tape onto the tube liner while translating the tube liner through the manufacturing station. As a stationary pressure body, a pressure body is meant which is fixedly mounted to the fixed world, contrary to the prior art wherein a pressure shoe rotates around the tube.

By providing a stationary pressure body, instead of for example a rotating pressure body, the pressure body can be simpler and more cost effective. For example, a number of shoes that are circumferentially positioned around the tube liner may be used to press the tape onto the tube liner. The pressure bodies may be arranged such that the complete circumference of the tube liner can be pressed on without allowing gaps between the pressure areas. To avoid gaps between different pressure areas of different pressure bodies, the pressure areas may be partially overlap. In particular, this may be possible when the pressure bodies are arranged in axial direction after each other. The tape can be wound spirally with an angle with respect to the longitudinal direction of the tube liner, onto the tube liner, but the tape can also be laid axially at an angle of approximately 0° onto the tube liner, since the tape is wound onto the tube liner with minimal or approximately no pretension in the tape. Advantageously a further tape layer is wound onto the tube liner. So, a plurality of tape layers can be wound on the tube liner for producing a composite tube. After having wound each tape layer, the tape layer can be consolidated. Also, a few tape layers can be wound onto each other and these few tape layers can then be consolidated at once. If a tape layer is wound and consolidated onto a previous consolidated tape layer, the tube already has a certain mechanical performance and rigidity, and may already be loaded during production, e.g. the tube may be spooled between each tape layer. It is not required to first manufacture the full pipe before the pipe can be spooled. The complete pipe may thus be manufactured in several steps. The process may be scalable, with a single manufacturing station multiple tape layers may be laid and a full end product can be made.

In an embodiment, the tube liner and/or the tape is of thermoplastic material and/or comprises thermoplastic material for improving adhesion of the tape to the tube liner and/or for improved flexibility characteristics of the tube. Analogously, the tape and/or the tube liner may be of thermoset material, or in a dry fibre form, possible stabilized with binder powder.

The invention further relates to an apparatus for manufacturing a continuous composite tube. According to the invention, the apparatus comprises a pressure body that provides pressure to the tape layer over an axial length of the tube liner for consolidating the tape layer.

The invention further relates to the use of a composite tube.

Further advantageous embodiments are represented in the dependent claims.

The invention will further be elucidated on the basis of exemplary embodiments which are represented in a drawing. The exemplary embodiments are given by way of non-limitative illustration of the invention.

In the drawing.

It is noted that the figures are only schematic representations of embodiments of the invention that are given by way of non-limiting example. In the figures, the same or corresponding parts are designated with the same reference numerals.

Figure 1:
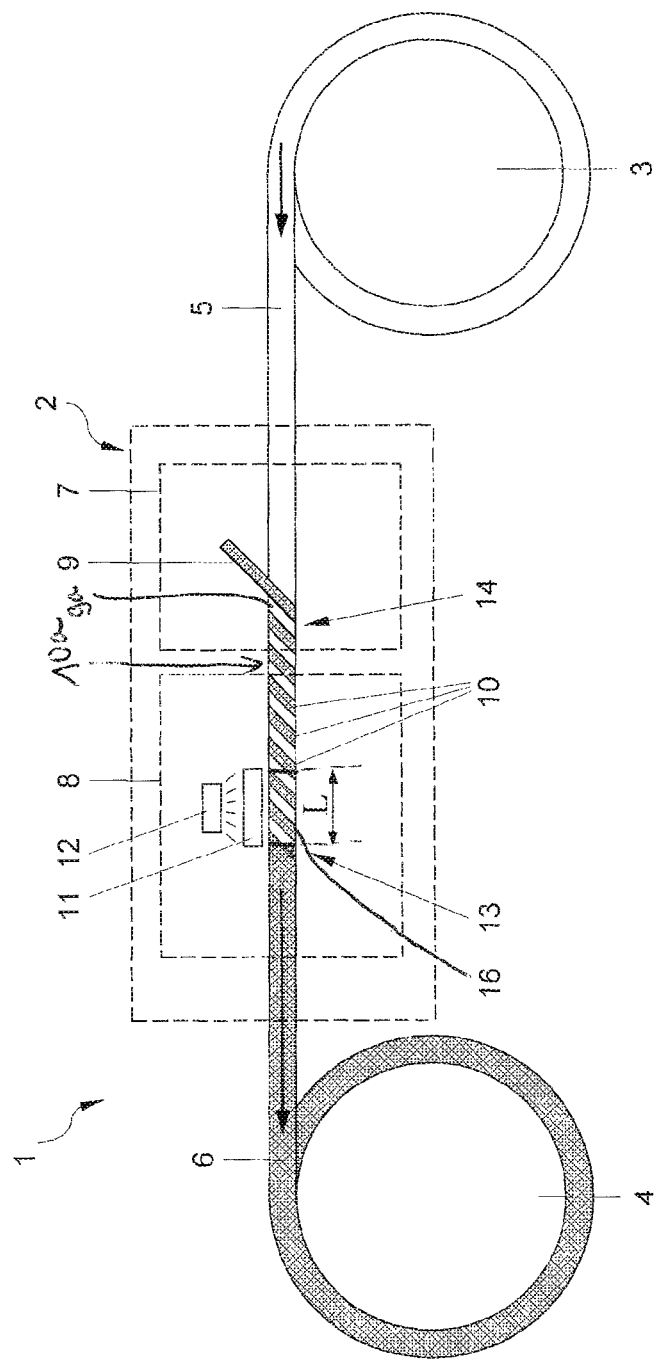
FIG. 1 shows a schematic representation of a first embodiment of an apparatus according to the invention.

FIG. 1 shows a schematic representation of an apparatus 1 according to the invention. The apparatus 1 for manufacturing a continuous composite tube comprises here a manufacturing station 2 and two reels 3, 4. A plastic, preferably thermoplastic, tube liner 5 is coiled onto the reel 3. During manufacturing of the composite tube 6, the tube liner 5 is translated through the manufacturing station 2 and coiled onto the reel 4. Thus a composite coiled tube 6 can be realized.

The manufacturing station 2 comprises a winding station 7 and a consolidation station 8. At the winding station 7 a composite, preferably thermoplastic, tape 9 is laid over the tube liner 5 to form a tape layer 10*a* on the tube liner 5 at the winding zone 14. The tape 9 can be a fibre reinforced tape. The tape 9 can be laid in paths 10 approximately next to each other. A small gap 9*a* between the tape paths 10 is acceptable or a small overlap between the tape paths 10 is acceptable. In FIG. 1 the gap 9*a* is exaggerated. The gap or overlap is small with respect to the width of the tape path 10. Ideally, the tape paths 10 abut against each other. By providing a force controlled pressure body, such a gap and/or overlap may be more easily accommodated.

Figure 6A:
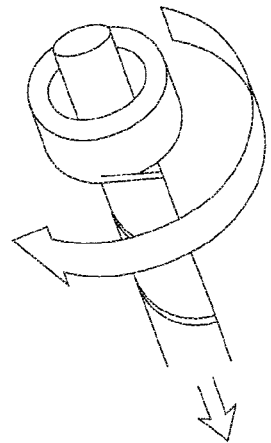
FIG. 6 shows schematic representations of winding for use in an apparatus according to the invention.
Figure 6B:
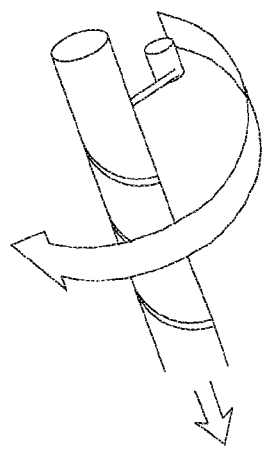
Figure 6C:
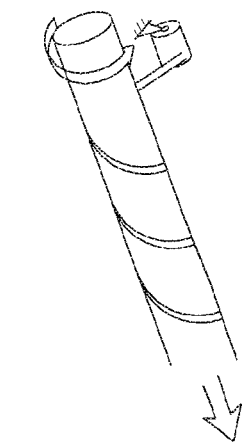
Figure 6D:
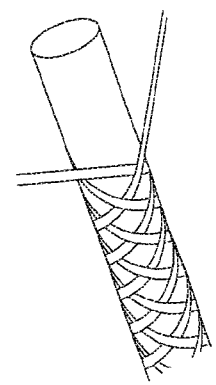
Figure 6E:
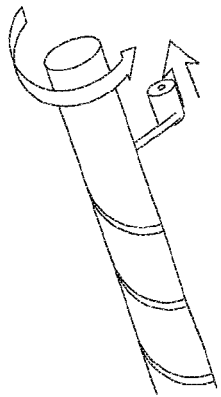

Examples of winding of the tape 9 onto the tube liner 5 are given in FIG. 5. FIG. 6*a* shows winding with a concentric fibre reel. FIG. 6*b* shows winding with rotating winding heads. FIG. 6*c* shows winding with fixed winding heads in which the tube is translating and rotating. FIG. 6*d* shows braiding the tape onto the tube liner and FIG. 6*e* shows winding the tape by translating the winding head and rotating the tube liner.

Figure 2:
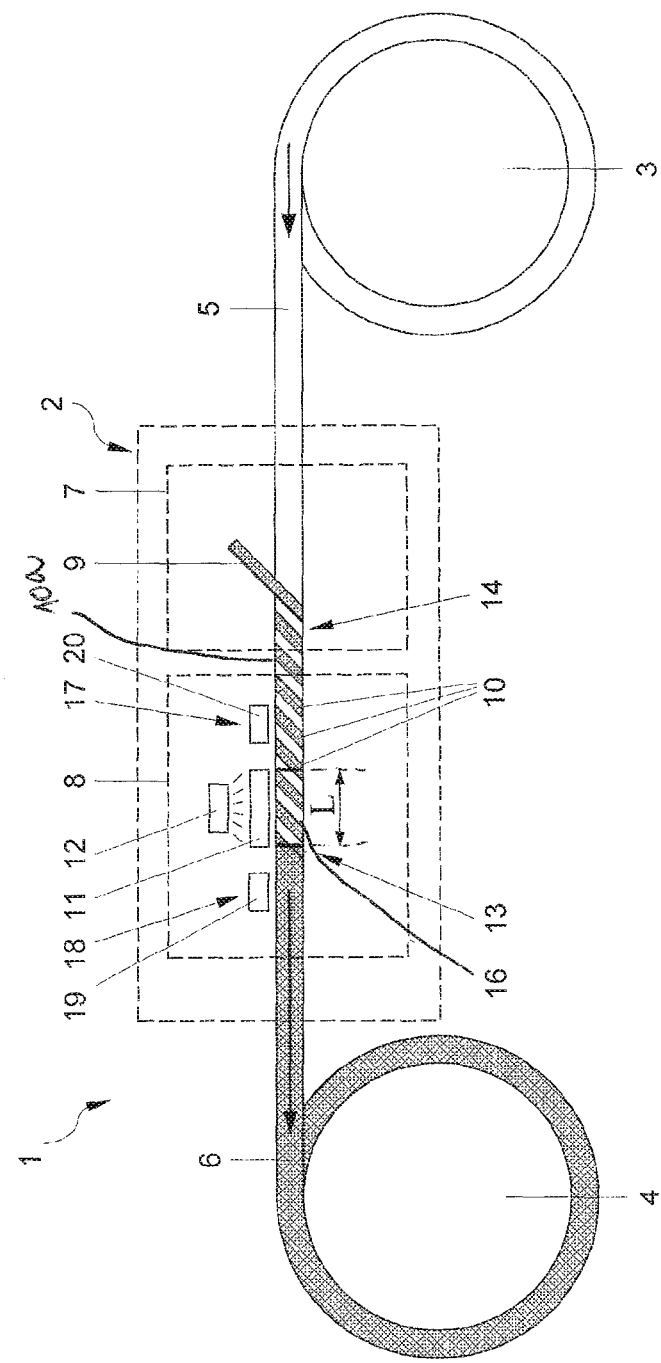
FIG. 2 shows a schematic representation of a second embodiment of an apparatus according to the invention.

Downstream of the winding station 7, the consolidation station 8 is positioned. At the consolidation station 8, the tape 9 is consolidated on the tube liner 5 by pressing, heating and optionally cooling, as shown in FIG. 2, of the tape 9 in the consolidation zone 13. In the embodiment of FIG. 1, the consolidation zone 13 comprises the consolidation area 16, having a length L, for pressing the tape layer 10*a*. The pressure body 11 and the consolidation area 16 are here schematically drawn. It is clear that the pressure body 11 applies pressure over an axial length L of the tube liner 5 and over at least a part of the circumference of the tube liner 5, preferably over the complete circumference.

Consolidation of the tape layer is done by applying pressure and heat to the tape layer 10*a*. The pressing and heating of the tape layer 10*a* is done here at the same place and at the same time at the consolidation area 16 so an optimal fusing of the tape layer 10*a* to the tube liner 5 can be obtained. By providing the consolidation of the tape layer 10*a* on the tube liner 5 at a distance downstream of the winding of the tape 9, a controlled process may be obtained.

FIG. 2 shows another embodiment of the invention, in which further a cooling zone 18 and a pre-heating zone 17 are provided. At the cooling zone 18 a cooling device 19 is arranged, and at the pre-heating zone 17 a pre-heating device 20 is arranged. First, there can be pre-heated to at least partly melting the tape 9 in the pre-heating zone 17, then pressure may be applied in combination with heat to fuse the tape 9 to the previous layer in the pressure zone 16. Thereafter, there may be cooled to freeze the fused tape in the cooling zone 18. Also, multiple consolidation zones may be provided e.g. in the same consolidation station or in multiple consolidation stations. Many variants are possible.

Instead of the embodiment shown, the heating device 12 may be omitted and the pre-heating device may be replace by a heating device, so pressure and heat are applied for consolidation of the tape layer, albeit not at the same location.

For consolidating the tape 9 onto the tube liner 5, a pressure body 11 and a heating device 12 is provided. In the examples shown in FIG. 1 and FIG. 2, the pressure body 11 is stationary with respect to the tube and/or the tube liner and/or the tape. The tube liner 5 is translating while the pressure body 11 is fixedly mounted and stationary with respect to the translating tube. Also, in the embodiments shown, the heating device 12 is stationary with respect to the tube and/or the tube liner and/or the tape. The pressure body 11 and the heating device 12 are arranged such that the pressure and the heat are applied over the consolidation area 16 of the tube liner 5 simultaneously at the same location. Advantageously, the pressure body 11 is arranged to provide pressure over a part of the circumference of the tube liner as well. Thus, over the consolidation area 16 of the tube liner 5 the tape layer 10a is consolidated to the tube liner 5.

FIG. 3 gives multiple examples of pressure bodies 11 that can be used, FIG. 4 gives multiple examples of flexible pressure bodies that can be used.

Figure 3A:
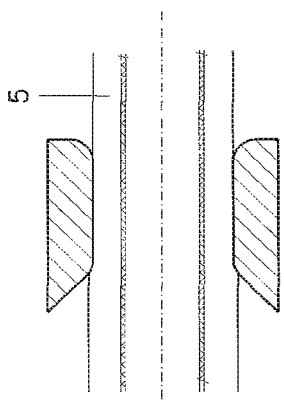
FIG. 3 shows schematic representations of pressure bodies for use in an apparatus according to the invention.
Figure 3B:
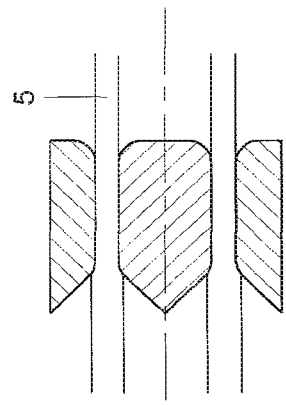
Figure 3C:
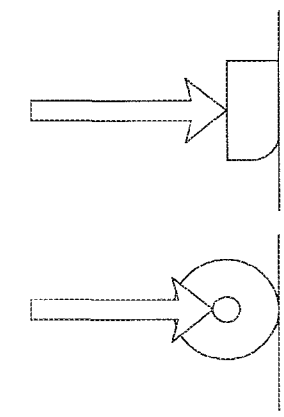
Figure 3D:
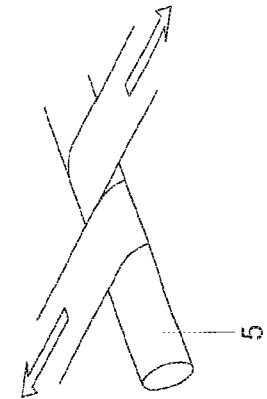
Figure 3E:
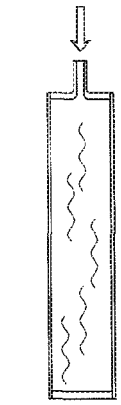
Figure 3F:
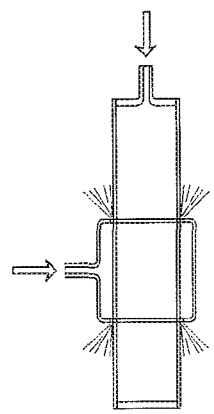
Figure 7:
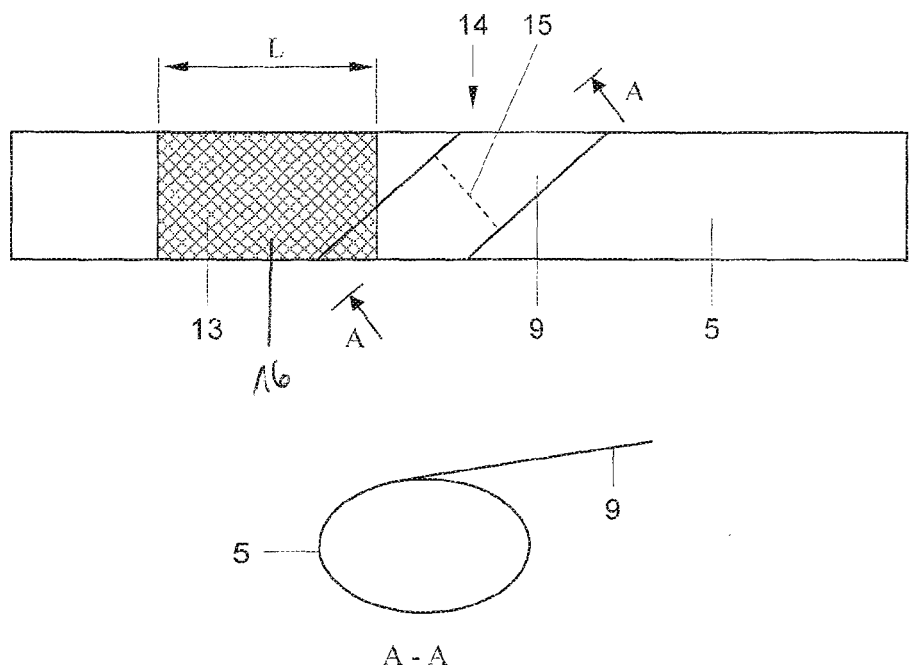
FIG. 7 shows a schematic representation of an embodiment of a winding zone and a consolidation zone according to the invention.

FIG. 7 shows that the consolidation takes place at a consolidation zone 13 at a distance downstream of a winding zone 14. At the winding zone 14, the tape is wound onto the tube liner 5, the point where the tape 9 contacts the tube liner 5 is usually referred to as the nip-point line 15. Decoupled from the winding of the tape 9, is the consolidation of the tape layer 10a that takes place at the consolidation zone 13 of the consolidation station 8. Consolidating the tape layer 10a onto the tube liner 5 by pressing and heating is done over an axial length L of the tube liner 5. Depending on the configuration of the pressure body 11, the consolidation zone extends over a circumferential section or over the complete circumference of the tube liner, such that the tape layer 10a is consolidated to the tube liner 5 over an area of the tube liner 5. FIG. 3a shows a pressure body that can be locally compressed, for example a rubber shoe, which can be for example positioned stationary with respect to the tape and/or the tube liner, and which can be in sliding contact with the tape and/or the tube liner. Also other pressure bodies may be positioned stationary. FIG. 3b shows to squeeze between a heated arbour and a die. FIG. 3c shows to heat and squeeze between a die and the tube liner. FIG. 3d shows to press by providing compressed air over an axial length of the tube liner 5. FIG. 3e shows to press by translating the tube liner 5 through a bath with compressed fluid. FIG. 3f shows to press by providing tension in a coiled belt around the tube liner 5.

Figure 4A:
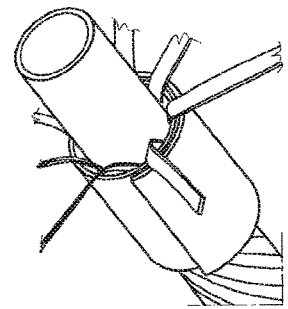
FIG. 4 shows schematic representations of flexible pressure bodies for use in an apparatus according to the invention.
Figure 4B:
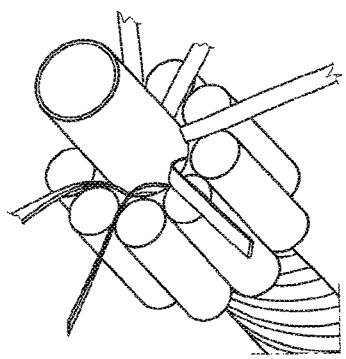
Figure 4C:
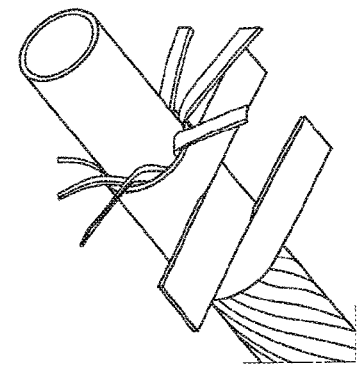
Figure 4D:
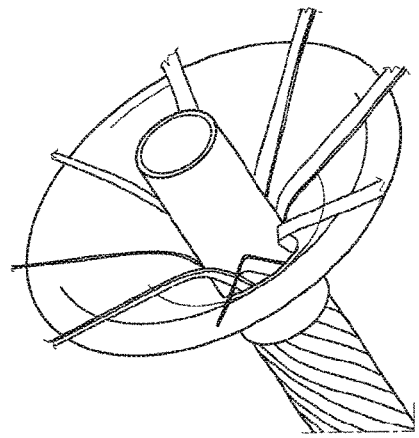
Figure 4E:
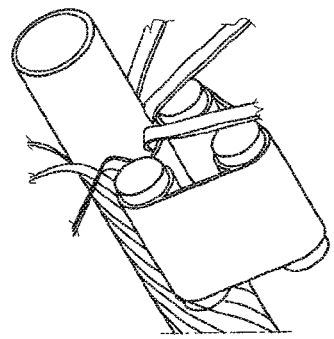
Figure 5C:
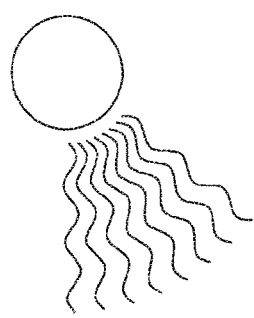
FIG. 5 shows schematic representations of heating devices for use in an apparatus according to the invention.
Figure 5F:
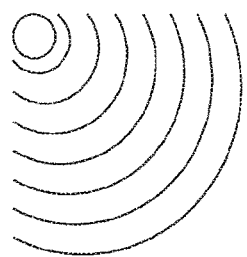
Figure 5B:
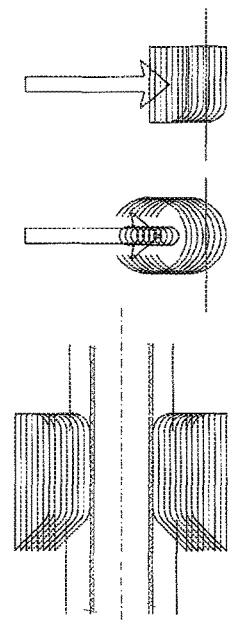
Figure 5E:
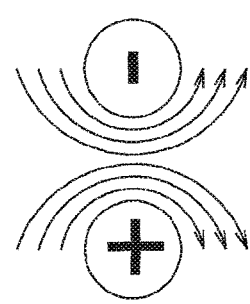
Figure 5A:
Figure 5D:
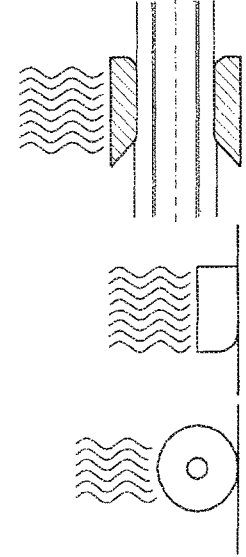
Figure 5G:
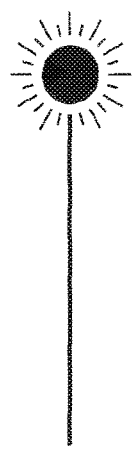

FIG. 4a shows providing pressure with a three point belt wrapped around the tube liner 5. FIG. 4b shows to provide pressure by rollers placed radially around the tube liner 5. FIG. 4c shows to press with a spring. FIG. 4d shows to press with a ring-shaped pressure device, while FIG. 4e shows a flexible shoe. Pressure bodies shown in FIG. 3 and FIG. 4 can be in some embodiments be positioned stationary with respect to the tape and/or tube liner.

The pressure is preferably applied over an axial length of the tube liner and/or over a circumferential part of the tube liner, such that an area of the tube liner 5 is subject to the pressure to consolidate the tape layer 10a in that area. As can be seen for example in the devices of FIGS. 3b, 3c, 3e and 3f and FIG. 4. Advantageously, during pressing with the pressure device, the tube liner 5 is internally pressurized as well to minimize collapse of the tube liner 5.

For consolidation, also heating is applied. The heating may be provided by a heating device 12 that may heat the tube liner directly, for example that the heating device 12 heats the tape and/or the tube liner, or indirectly, for example the heating device 12 heats the pressure body 11 which in turn heats the tape and/or tube liner. Heating devices may be positioned stationary with respect to the tape and/or the tube liner. Also, a heating device may be combined with a pressure device, e.g. a heated shoe that can apply pressure onto the tape and/or the tube liner.

FIG. 5 shows some embodiments of a heating device 12 that may be applied. For example, FIG. 5a shows heating by a gas torch or hot air. FIG. 5b shows heating by using ultrasonic waves. FIG. 5c shows heating with infrared radiation. FIG. 5d shows heating by conduction (contact heating). FIG. 5e shows heating by induction. FIG. 5f shows microwave heating. FIG. 5g shows heating by laser. In an embodiment heating may be performed by generating an electric current in a resistance element. For active cooling for example methods shown in FIG. 4a and FIG. 4d can be used. With the method of FIG. 5a, cooled air is blown against the product, and with the method of FIG. 5d a cooled contact element is brought in contact with the pipe.

The heating is preferably done over an axial length of the tube liner and/or over a circumferential part of the tube liner, similar to applying the pressure to provide for an optimal consolidation. Preferably, the heating is applied simultaneously with the pressing and at the same location. By heating the tube liner 5 and/or the tape 9, the fusing of the tape layer 10a to the tube liner 5 can be improved.

Preferably, the tube liner 5 and/or the tape 9 are heated by contact heating, to increase the heat exchange to the tape and/or the tube liner and to improve the fusing between the tape 9 and the tube liner 5. Advantageously, the pressure body 11 itself is heated. By pressing the heated pressure body 11 onto the tape 9 and the tube liner 5, the tape 9 and the tube liner 5 are heated. In the same way, cooling can be realised.

Manufacturing of the composite tube can be a continuous process, meaning that during translation of the tube liner 5 through the manufacturing station 2, the tape layer 10a is consolidated on the tube liner 5. During consolidation, the pressure body 11 is in contact with the tape 9 for pressing the tape 9 onto the tube liner 5. Preferably, the pressure body 11 is force controlled, which may result in a relatively even pressure distribution over the area, in particular when the pressure body 11 is in sliding contact with the tape layer 10a.

A further tape layer may be wound onto the tube liner 5 on top of the tape layer already present on the tube liner 5. For example, a further manufacturing station may be provided downstream of the manufacturing station 2. Also, when the reel 3 is free of the tube liner 5 and the tube 6 is coiled onto the reel 4, the reels 3, 4 may be exchanged and the process can start anew. A further tape layer is then wound on top of the present tape layer when processing the tube liner 5 again through the manufacturing station 2. Many tape layers may be wound onto the tube liner 5, for example up to 40 tape layers or more may be wound. Preferably, each tape layer 10a is consolidated after being wound, and a further tape layer 10a is wound over a previously consolidated tape layer. Alternatively and/or additionally, a few tape layers may be wound on top of each other and may then be consolidated at once. However, the number of tape layers thus consolidated is limited, preferably six or less. This is contrary to the prior art where usually all tape layers are wound in advance and then consolidated at once.

Many variants will be apparent to the person skilled in the art. All variants are understood to be comprised within the scope of the invention as defined in the following claims.

The invention claimed is:
1. Method for manufacturing a thick walled multi-layer, spoolable, continuous composite tube comprising:
   providing a tube liner;

translating a tube liner through a manufacturing station wherein the manufacturing station comprises a separate winding station and a separate consolidation station located at a distance downstream of the winding station;

winding a composite tape on the tube liner or a previously wound and consolidated composite tape layer at the winding station for forming a tape layer; and consolidating the wound composite tape layer on the tube liner or a previously wound and consolidated composite tape layer at a consolidation zone of the consolidation station by applying external pressure by a force controlled pressure body in direct sliding contact with the composite tape layer, wherein the force controlled pressure body is a flexible pressure body flexible in both an axial and a circumferential direction to accommodate irregularities on the tube liner or a previously wound and consolidated composite tape layer, and applying heat to the tape layer of which at least the pressure is applied over an axial-circumferential consolidation area encompassing an axial length and encompassing a section of a circumference of the tube liner; and repeating the translating, winding and consolidating steps at the manufacturing station to form a thick walled multi-layer, spoolable continuous composite tube of a desired thickness.

2. Method according to claim 1, further comprising providing internal pressure to the tube liner during consolidation.

3. Method according to claim 1, further comprising heating the tape layer simultaneously and at the same location as pressing the tape layer.

4. Method according to claim 1, wherein heating is provided by contact heating.

5. Method according to claim 1, wherein the axial-circumferential consolidation area is large enough to prevent damage to an unreinforced tube liner.

6. Method according to claim 1, wherein the flexible force controlled pressure body comprises multiple fingers each applied over a part of the axial length and a part of the section of the circumference of the tube liner.

7. The method of claim 1 wherein the irregularities on the tube liner comprise the tube liner having an irregular shape.

8. The method of claim 7 wherein the irregular shape is an oval cross-section.

9. The method of claim 1 wherein the irregularities on the tube liner or a previously wound and consolidated on composite tape layer comprise the continuous composite tubing having diameter that increases with each application of a consolidated tap layer.

10. The method of claim 1 wherein multi-layer spoolable continuous composite tube comprises at least 40 layers of wound and consolidated composite tape.

11. Apparatus for manufacturing a thick walled multi-layer, spoolable, continuous composite tube wherein the apparatus comprises a manufacturing station arranged to allow translation of a tube liner there through, wherein the manufacturing station comprises a separate winding station for winding a composite tape on the tube liner for forming a tape layer and a separate consolidation station at a distance downstream of the winding station for consolidating the wound composite tape layer on the tube liner by applying external pressure by a force controlled pressure body, wherein the force controlled pressure body is a flexible pressure body flexible in an axial and a circumferential direction to accommodate irregularities on the tube liner or a previously wound and consolidated composite tape layer in direct sliding contact with the composite layer, and further configured to apply heat to the tape layer, wherein the pressure is applied over an axial-circumferential consolidation area comprising a an axial length and a section of a circumference of the tube liner, the apparatus further including at least one spool for receiving the tube liner upon application of a consolidated composite tape layer, the spool being operatively associated with the manufacturing station to feed the tube liner repeatedly to the manufacturing station to form a thick walled multi-layer, spoolable continuous composite tube of a desired thickness.

12. Apparatus according to claim 11, further comprising a heating device for heating the tape layer simultaneously and at the same location as pressing the tape layer.

13. Apparatus according to claim 12, wherein the heating device is arranged for heating the pressure body for providing contact heating.

14. The apparatus according to claim 11, wherein the axial-circumferential consolidation area is large enough to prevent damage to an unreinforced tube liner.

15. The apparatus according to claim 11, wherein the flexible force controlled pressure body comprises multiple fingers each applied over a part of the axial length and a part of the section of the circumference of the tube liner.

16. The apparatus of claim 11 wherein the irregularities on the tube liner comprise the tube liner having an irregular shape.

17. The apparatus of claim 16 wherein the irregular shape is an oval cross-section.

18. The apparatus of claim 11 wherein thick walled multi-layer spoolable continuous composite tube comprises at least 40 layers of wound and consolidated composite tape.

* * * * *

UNITED STATES PATENT AND TRADEMARK OFFICE
CERTIFICATE OF CORRECTION

PATENT NO. : 10,144,171 B2
APPLICATION NO. : 14/002944
DATED : December 4, 2018
INVENTOR(S) : Kremers It is certified that error appears in the above-identified patent and that said Letters Patent is hereby corrected as shown below:

On the Title Page

Item (73), should read, Assignee: AO & G Holding B.V., IJmuiden, Netherlands

Signed and Sealed this
Third Day of December, 2019

Andrei Iancu
*Director of the United States Patent and Trademark Office*